March 4, 1930.  R. E. ROBB  1,749,606
PROCESS FOR DETERMINING MOISTURE IN AGGREGATE
Filed Aug. 17, 1928
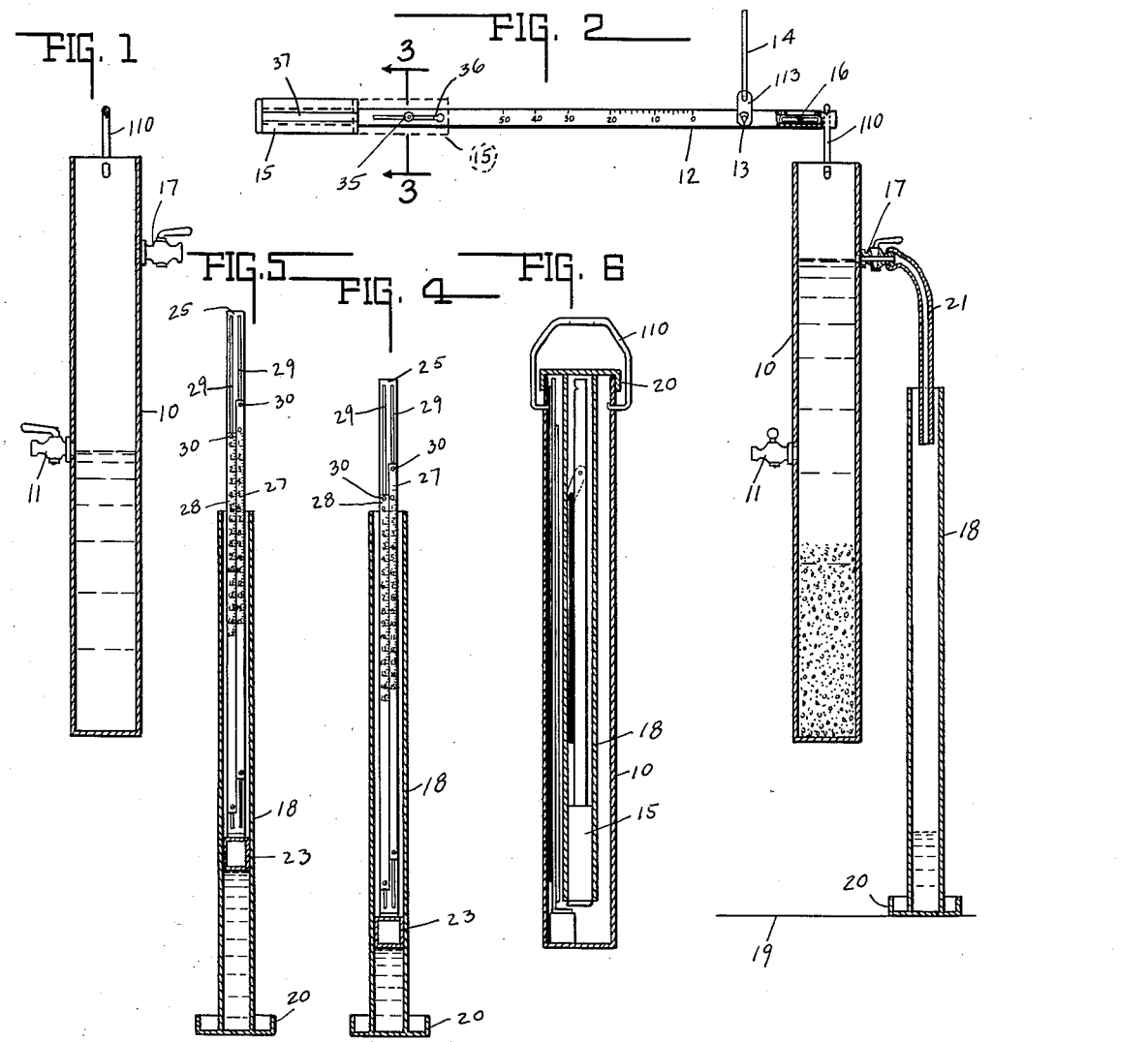
INVENTOR.
ROBERT E. ROBB,
BY
ATTORNEYS.

Patented Mar. 4, 1930

1,749,606

UNITED STATES PATENT OFFICE

ROBERT E. ROBB, OF EVANSVILLE, INDIANA

PROCESS FOR DETERMINING MOISTURE IN AGGREGATE

Application filed August 17, 1928. Serial No. 300,235.

The object of this invention is the determination of the moisture in aggregate or any other non-soluble, granular material being tested. The process depends upon the weight or relative specific gravity of the material.

Another object of the invention is to provide a process for determining the moisture in aggregate and the like which can be carried out by a very simple, cheap and compact apparatus weighing only a few pounds and which can easily be carried by the operator and the test made wherever desired. Furthermore, this process enables any mechanic or other person on a construction job to readily and accurately predetermine the amount of moisture contained in the gravel, stone, sand or other aggregate or other non-soluble, grannular material which is to be used for concrete construction, and to do this without the necessity of drying a sample of the material and without having to resort to the use of computations, charts, figures, tables or other mechanical aid. This enables such mechanic or other person without any special education, training or skill to scientifically and accurately make concrete of the desired quality.

The process briefly stated consists first in preparing a test standard and then applying the test standard in determining the amount of moisture in the aggregate. This test standard may be repeatedly employed in carrying out the portion of the process directly relating to the determination of the moisture in the actual material to be tested or used.

The process of determining the test standard consists in introducing a known weight of dry aggregate into a constant volume of water or other liquid, determining the amount of water displaced by the said aggregate and then determining the weight of the remaining water and dry aggregate.

The process of applying the test standard in determining the moisture in the moist aggregate to be tested consists in placing the same weight of aggregate to be tested, excluding the moisture therein, in water of constant volume as used in the standard test and finally determining the difference between the water displaced in the standard test and the water displaced by the moist aggregate, which gives the water actually carried by the sample of moist aggregate tested and which may be measured in any convenient units or percentage. This latter process may be specifically carried out by introducing the moist aggregate to be tested into the same volume of water used in the standard test until their combined net weight equals or counterbalances the weight in the standard test and by determining the percentage of difference in the amount of water displaced by the moist aggregate and that displaced in making the standard test.

The full nature of the invention will be understood from the accompanying drawings and the following description and claims:

In the drawings, Fig. 1 is a central vertical section through the main vessel with a certain or constant volume of water therein. Fig. 2 is a side elevation of a counterpoise and scale beam having the said main vessel suspended therefrom shown in central vertical section and containing a known weight of aggregate and a central vertical section through a smaller vessel for containing displaced water with a tubular connection from said main vessel discharging into said displacement water vessel. Fig. 3 is a transverse section through the counterpoise on the line 3—3 of Fig. 2. Fig. 4 is a central vertical section of the displaced water vessel with the measuring bar in elevation installed in said vessel, showing its position at the end of the standard test. Fig. 5 is the same with the measuring bar in its position at the end of the test of the moist aggregate to be tested. Fig. 6 is a central longitudinal section of the apparatus assembled for transportation.

While water is referred to herein as the liquid used, the invention is not limited to any particular liquid as some other kind of liquid might be used in certain situations instead of water. Also "moist" and "moisture" are used in the claims hereof to include or refer to any liquid or liquid condition.

Various kinds of apparatus and manual manipulations may be employed in carrying out the process or processes constituting this invention. But, to illustrate the general nature of the invention, there is one very simple, cheap and easily carried and operated apparatus which is shown herein.

There are two groups of process steps herein to be considered. The first process or group of process steps relates to determination of a test standard for measuring moisture in aggregate, and when that process is carried out and the test standard established or determined, such test standard is employed repeatedly for determining the moisture in the actual aggregate to be tested in any number of instances so long as the aggregate to be tested is of the same character substantially as the aggregate used in making the standard test. Thus the same standard test may be used in carrying out the remainder of the total process in making 40 tests of actual aggregate or used for many days in the same kind of work. This renders it unnecessary to make a standard test more than one time for determining the moisture in the aggregate to be tested of the same general nature.

Furthermore, the same apparatus may be used in making each of these two kinds of tests, the standard test and the final test and this is one of the great advantages of this process.

The following are the steps and the apparatus used in making the standard test for measuring moisture in aggregate:

In the first place, a known or constant volume of water or other liquid is introduced into the vessel 10 up to the pet cock 11 shown in Fig. 1. It is immaterial what the volume or weight of water in said vessel up to said pet cock may be so long as the volume of water is known, because, in carrying out the subsequent steps of the process, this volume or weight of water is constant. The location of pet cock 11 in vessel 10 may be imperically or arbitrarily determined, although, in practice, the volume of water should be enough to cover a certain weight of dry aggregate or other material to be used in this part of the process,—say five pounds. Therefore, the position of the pet cock 11 would be varied according to the character of the material to be tested. It requires much less water to cover five pounds of sand than to cover five pounds of crushed rock, because the crushed rock has larger spaces between the particles. Hence, the particular location of the pet cock 11 is chiefly dependent upon the character of the material to be tested. The water is introduced into vessel 10 and, when it ceases to flow out of said pet cock 11, it is closed, as shown in Fig. 2.

In carrying out the invention, broadly speaking, the next step is to introduce into said vessel 10 a known or predetermined weight of dry aggregate of the kind that is to be tested. In the usual size of the apparatus herein disclosed, five pounds of such dry aggregate is placed in vessel 10, as seen in Fig. 2. The pet cock 11 has been closed and another pet cock 17 is opened, as shown in Fig. 2, for the displacement water or overflow from vessel 10 to pass into the displacement vessel 18, shown in Fig. 2, which rests on the floor or table 19 and has a dish-shaped bottom cap 20, as herein shown.

The water displaced from vessel 10 by the dry aggregate introduced therein passes through the open pet cock 17 through a rubber tube 21 in the apparatus herein shown.

The apparatus which may be used for accomplishing this second step in the process may differ in many respects from that herein shown. The location of pet cock 17 in vessel 10 of the apparatus herein shown is usually determined imperically. It must be located above the water and, say five pounds of, the dry aggregate introduced in the vessel 10, and below the top of the water in said vessel after the dry aggregate has been placed therein. It could, therefore, be located higher if crushed rock or coarse material constitutes the aggregate than if fine material were used, which holds less water. It is practically immaterial where the pet cock 17 is located between the above-mentioned limits, but it must be above the aggregate and below the top of the water after the aggregate is placed in the vessel.

The ultimate result of the total process or test will be the same wherever the pet cock 17 may be, if located between said limits. After the known amount of dry aggregate has been placed in said vessel 10 and the displaced water has gone over into vessel 18 through pet cock 17, the vessel 10 and its contents are weighed by any suitable weighing means and, when the weight or volume of the displaced water is determined, the second step of the process is completed.

However, the weighing means in the apparatus herein shown is preferable over any other weighing means, as it is merely a counterbalancing means which really requires no weight or scale beam graduations. The weighing part of the second step of the process may be carried out by the counterbalancing process or means which will now be described.

The vessel 10, with only the water in it up to the lower pet cock 11 and that pet cock closed, is suspended by a loop 110 on the short end of the balancing beam or scale beam 12, which has knife-edge bearings 13 in a saddle strap 113 suspended by a hanger 14 to any fixed support, and a counterpoise 15 slidable on said beam. Then the dry aggregate is introduced into the vessel 10, as shown in Fig. 2. In the apparatus herein shown, as usually made, five pounds of such dry aggregate is placed in said vessel and the counterpoise 15 is slid toward the end of the balancing beam 12 so as to substantially counterbalance the vessel 10 with its contents of water and aggregate. After the surplus or displaced water has run out through pet cock 17 into the displaced water vessel 18, the counterpoise is then moved to an exact balancing position, as indicated by dotted lines in Fig. 2. Obviously, the dry aggregate could be introduced into vessel 10 before it is suspended on the balancing beam 12, but the practice has generally been as above explained. An air bubble means 16 is located in the beam 12, as shown near the right-hand end of the beam, to indicate when there is an exact counterbalance between the vessel 10 and its contents on the one hand and the scale beam and counterpoise on the other hand.

The position of the poise 15 which counterbalances vessel 10 and its contents may be determined by weight graduations on the weighing scale beam but which are not here shown for the sake of clearness. The preferable arrangement, however, is to have no such weight graduations on the scale beam but secure the counterpoise 15 in its exact counterbalancing position by suitable means, and, in the subsequent steps of the process, and particularly those devoted to the test of the moist aggregate, this result of the standard test can be repeatedly used as long as the moist aggregate, as herein explained, is of the same character as the dry aggregate used in making the standard test. The dry aggregate used in the standard test, therefore, must be of the same character as the moist aggregate with which one is expected to work and utilize the standard test. Thus, if the work relates to testing moist sand or fine material, it must be that kind of dry material as used in making this standard test. If it be coarse moist material, or crushed rock, to be used in making the standard test, the same kind of dry material must be used in making the standard test.

The weight of vessel 10 and the contents having been weighed, or counterbalanced which is the same thing, as above explained, a memorandum is kept of the weight, or, if using the apparatus herein set forth, counterpoise 15 is secured to the beam in its counterbalancing position. That may be done by any means but herein there is shown in Fig. 3 a cross-section of the counterpoise shown in position in Fig. 2 and of the beam on which it is mounted. The beam has for each kind of material, such as fine or coarse material that is to be tested, a longitudinal slot 36 in which a stop 35 is adjustably secured. This is preferably a headed screw which is tightened in place on the beam 12. The poise 15 is provided with a longitudinal slot 37 into which the head of the stop 35 projects and also a recess 137 is located in the inner wall of the poise leading from the slot 37, which recess is large enough to receive the head of the stop 35 and when the counterpoise 15 is located at the balancing position, it is turned so that the head of the stop 35 will project into the recess 37 and hold the poise 15 in the balancing position for the various subsequent tests and uses of the apparatus in making tests of moist aggregate of the same kind for which the standard test has been made. This will enable the parts of the apparatus to be separated and handled without the poise 15 changing position on the beam 12, so that it can be used in dozens of operations, and this is one of the results of the standard test herein referred to, as the position of the poise establishing this test will remain the same while testing moist aggregate of this kind.

On the opposite side of the beam is a similar stop and slot for a different grade of aggregate and the poise there has an internal groove 38.

The next step in the operation is to measure the displaced water in vessel 18 while making said standard test with the dry aggregate. This water may be measured as desired. It may be weighed by any suitable means or it may be measured, in a sense, by the measuring bar 25 shown in Fig. 4. The measuring or weighing of the displaced water, however, may be made before the poise 15 is secured on the beam 12 or afterwards, as desired. The measuring bar 25 consists of a metal bar with one or more scale strips 27 and 28 on it. Scale strip 27 is for relatively fine material and scale strip 28 is for relatively coarse material. These scale strips are provided with graduations, as shown, indicating the percentage of moisture in the moist aggregate being tested or to be tested in terms with reference to the weight of the dry aggregate employed in making the standard test. That is, if there is one pound of water to ten pounds of aggregate, there would be ten percent of moisture and that would be indicated by the numeral 10 on the scale. This is a metal bar having secured to its lower end a piston-like head or bottom 23 which is insertable into vessel 18 down to the water.

Scale bar 25 is provided with longitudinal slots 29 and the scale strips 27 and 28 are held thereon by screws 30 extending through said slots, whereby said scale strips are longitudinally adjusted according to whether the material is fine or coarse. These scale strips are located in their proper places on the bar 25 by adjusting them so that when the piston-like member 23 rests upon the top of the displaced water in vessel 18, the zero mark on the scale strip will register with the top of vessel 18. Scale strip 28 is adjusted in a similar manner with reference to coarse material.

The foregoing steps in the process are employed in making what is called the standard test, and, in the apparatus herein shown, in Fig. 5, results of such tests are the adjustment of the proper scale strips 27 and 28 on the measuring bar 25 for indicating the displacement of water by the aggregate tested, and the counterbalancing position of the counterpoise 15 on the beam 12. If such apparatus is not used, the weight in pounds and ounces of the vessels 10 and 18 and their contents, as shown in Fig. 2, are recorded and the percentage of moisture in the aggregate determined therefrom.

If it be desired that the amount of water actually contained in one cubic foot of the material be measured volumetrically, scale strips 127 and 128 are secured on the back side of the measuring bar 25 with graduations 131 thereon which indicate the gallons or pounds of water per cubic foot in similar aggregate in damp, loose condition, as shown in Fig. 5.

After the standard test has been made, as heretofore explained, the second stage or phase of the process consists in testing moist aggregate of the kind that is to be used in the concrete or other work and in using the results of the standard test in carrying out this last part of the process. If a simple weighing apparatus indicating pounds and ounces be employed, the next step in the process consists in introducing an equal weight of moist aggregate of the kind of aggregate used in the standard test with the same amount of water, and then separating the surplus or displaced water, until the balance weighs the same as in the standard test, then weighing said displaced water, and deducting the weight of the displaced water in the standard test from the weight of the displaced water in the moist aggregate test, which difference will be the amount of water actually carried by the sample of the moist aggregate tested, or the difference in the water shown in Figs. 4 and 5.

This latter amount may be measured in any convenient units or expressed by determining the percentage of this latter amount, that is, of the water actually carried by the moist aggregate in proportion to the weight of the dry aggregate in the standard test.

But preferably the second part of the total process is carried out by the use of the same means substantially as is employed as shown herein for making the standard test. This avoids the preservation of any records or tables or making any computations.

The next step employed, if one uses the apparatus shown herein, is to empty the vessels 10 and 18 used in making the standard test. In fact, the apparatus is carried around from place to place for use in connection with determining the moisture in the aggregate to be tested at any time or place. In making the moist aggregate test, the vessel 10 is filled with water up to lower pet cock 11. Then the lower pet cock 11 is closed and the upper pet cock 17 is opened and the moist aggregate being tested is introduced into the vessel 10 until the vessel and its contents counterbalance the counterpoise 15 in its line location as shown in Fig. 2, after the surplus water has ceased flowing through pet cock 17 into vessel 18. The displaced water which is then in vessel 18 is deemed to be the quantity of displaced water.

The water now contained in vessel 18 is measured by the measuring device 25, being inserted into said vessel until the piston-like member rests on the water therein, and the numeral exposed at the upper end of the vessel will indicate the percentage of moisture contained in the aggregate last introduced into the vessel 10, which was the sample of moist aggregate. In other words, with this test, if the aggregate weighed five pounds and the water displaced was three-fifths pound, the scale would indicate six percent of moisture in the aggregate tested.

The apparatus shown herein is assembled as appears in Fig. 6 so that it is easily transported. As there seen, the vessel 10 becomes an external holder of the remainder of the apparatus with the loop 110 as a handle for carrying it. The measuring bar 25 is first placed in vessel 18 with the piston-like end 26 at the bottom. Then the scale beam 12 is placed in the vessel 10 with the counterpoise 15 at the bottom and the hanger 14 hanging down in the side of beam 12. Then the vessel 18 is inverted and inserted in the vessel 10 with the bottom cap 20 covering or constituting a lid for the upper end of the vessel 10. The assembled apparatus weighs only a few pounds and is easily carried by one hand and quickly set up and used in making either the standard test or the final moist aggregate test.

The invention claimed is:

1. The process of determining the moisture in aggregate, which process consists first in preparing a test standard by determining the amount of liquid displaced by a known weight of dry aggregate of the kind of aggregate to be tested when placed in liquid of known volume, then determining the amount of liquid displaced by the moist aggregate to be tested by placing the same weight of aggregate in the same volume of liquid as used in the standard test, and finally determining the difference between the amount of liquid displaced in the standard test and the amount of liquid displaced in the test of the moist aggregate.

2. The process of determining the moisture in aggregate, which process consists first in preparing a test standard by determining the amount of liquid displaced by a known weight of dry aggregate of the kind to be tested when placed in liquid of known volume, then determining the amount of water displaced by the moist aggregate to be tested when the same weight of aggregate irrespective of the moisture contained therein is placed in liquid of constant volume as used in the standard test, and finally determining the liquid displaced in the standard test as compared with the liquid displaced by the moist aggregate, the difference being the amount of liquid actually carried by the sample of moist aggregate tested.

3. The process of determining the moisture in aggregate by first introducing a known weight of dry aggregate in a known volume of liquid, determining the amount of liquid displaced by said aggregate, determining the weight of said aggregate and the remaining liquid in the standard test, then introducing the moist aggregate to be tested into the same volume of liquid until their combined weight after the liquid displacement equals the weight of the test standard, determining the amount of liquid displaced by the moist aggregate therein, and finally determining the difference in the amount of liquid displaced by the moist aggregate in comparison with the amount displaced in making the test standard.

4. The process of determining the moisture in aggregate by introducing a known weight of dry aggregate in a known volume of liquid, determining the amount of liquid displaced by said aggregate, counterbalancing the weight of said aggregate and remaining liquid by a weight as a test standard, then introducing the moist aggregate to be tested in the same volume of liquid until they after the liquid displacement counterbalance the weight in said standard test, determining the amount of water displaced by the moist aggregate, and finally determining the difference in the amount of water displaced by the moist aggregate as compared with that displaced in making the test standard.

5. The process of determining the moisture in aggregate by first introducing a known weight of dry aggregate in a known volume of liquid and allowing a portion of said liquid to be displaced, weighing the remaining liquid and aggregate, weighing the displaced liquid, then introducing moist aggregate to be tested into the known volume of liquid until the weight of aggregate in liquid shall be the same as the weight of the dry aggregate and liquid, weighing the liquid displaced by the moist aggregate, and determining the difference between the amount of liquid displaced by the dry aggregate and the moist aggregate, which difference will indicate the amount of liquid actually carried by the moist aggregate being tested.

6. The process of determining the moisture in aggregate by first introducing a known weight of dry aggregate in a known volume of water in a vessel, displacing a portion of the water above said aggregate in the vessel, counterbalancing the water and aggregate in said vessel by suitable means, introducing moist aggregate to be tested in such vessel with said known volume of water, removing the surplus water until the remaining water and moist aggregate shall be counterbalanced by the same means, and determining the difference in the amount of water displaced by the moist aggregate in comparison with that displaced by the dry aggregate.

7. The process of determining the moisture content of aggregate which comprises introducing a measured quantity of aggregate into a measured quantity of liquid to establish a standard indication, then introducing a corresponding quantity of moist aggregate to be tested into such measured quantity of liquid, and determining the displacement of said liquid with relation to the standard indication.

In witness whereof, I have hereunto affixed my signature.

ROBERT E. ROBB.